Sept. 9, 1941. A. A. LETHERN ET AL 2,255,258
QUICK-RELEASE FASTENING FOR SAFETY HARNESSES,
PARACHUTE HARNESSES, AND THE LIKE
Filed Dec. 6, 1939
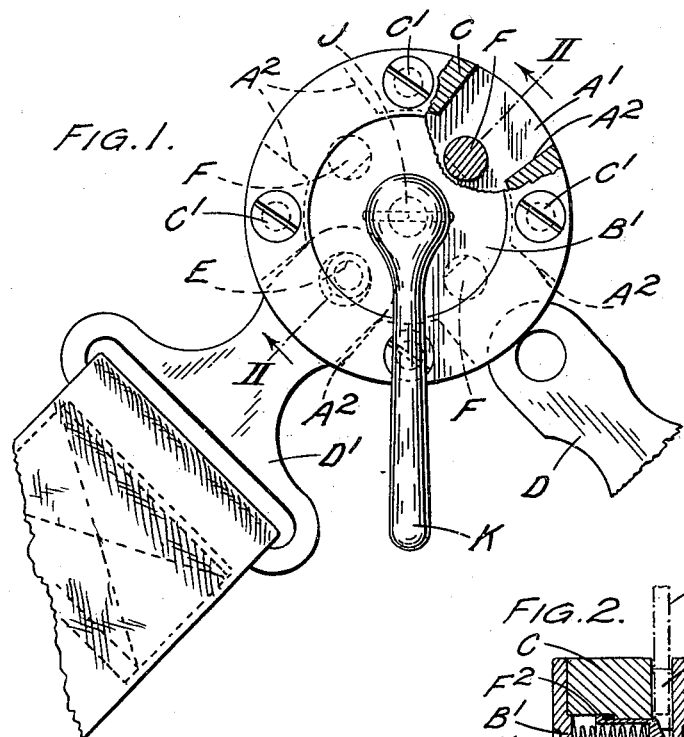
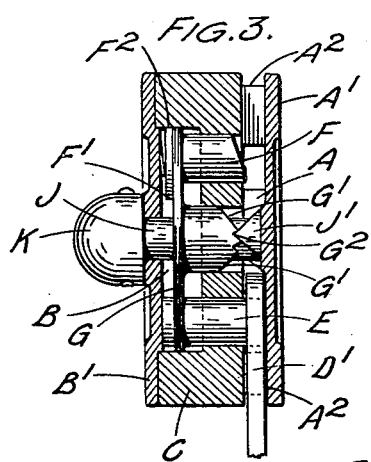
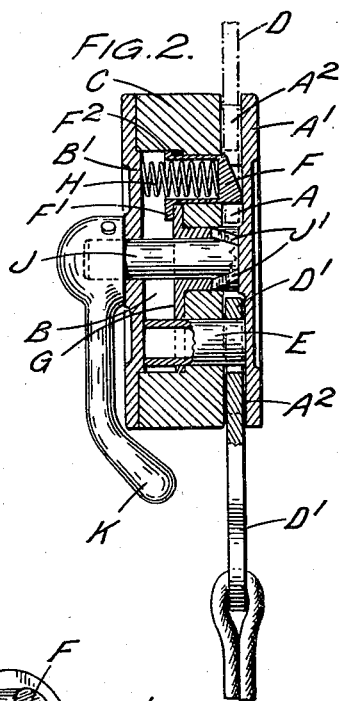
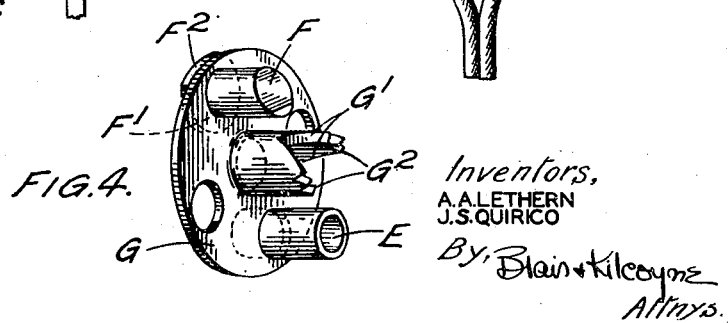
Inventors,
A.A.LETHERN
J.S.QUIRICO
By Blair+Kilcoyne
Attnys.

Patented Sept. 9, 1941

2,255,258

UNITED STATES PATENT OFFICE 2,255,258

QUICK-RELEASE FASTENING FOR SAFETY HARNESSES, PARACHUTE HARNESSES, AND THE LIKE

Albert Alexander Lethern and Joseph Secondo Quirico, London, England, assignors to The Mills Equipment Company Limited, London, England, a company of Great Britain Application December 6, 1939, Serial No. 307,932
In Great Britain January 31, 1939

6 Claims. (Cl. 24—205)

This invention relates to quick-release fastenings for safety harness, parachute harness and the like of the kind which are used to connect together strap plates, that is to say plates secured to the straps of the harness or the like and each having a hole which is adapted to be engaged by a locking device constituting part of the quick-release fastening.

The object of the invention is to provide an improved quick-release fastening of this kind which will be capable of withstanding high stresses, will be simple and reliable in operation and adapted to be released with certainty and rapidity when desired, for example in an emergency, without being prone to inadvertent release.

To this end, a quick-release fastening of the kind referred to according to the present invention comprises a casing having two or more slots therein each adapted to receive the perforated end of a strap plate, a spring-pressed bolt member associated with each slot and capable of extending across the slot to engage the hole in the strap plate or of being withdrawn against the action of its spring so as to release the strap plate, a releasing plate within the casing through which the bolts pass and can slide and adapted, when moved in the appropriate direction, to act on all the bolts to move them against the action of their springs, a pivoted operating lever outside the casing, and cam mechanism between the lever and the releasing plate such that, by rocking the lever, the releasing plate can be moved to withdraw the bolts and, when so moved so that the bolts occupy their fully withdrawn position, will be held from returning into its locking position until again moved by hand.

Preferably the operating lever is pivoted about an axis parallel to the movement of the bolts, the cam mechanism being of the face cam type, one part of which is rigid with the lever while the other part is rigid with the releasing plate.

Thus, in a preferred construction, the quick-release fastening comprises a substantially cylindrical casing divided by a transverse partition normal to its axis into a releasing mechanism chamber and a plate-receiving chamber having a number of radial slots in its wall through each of which the end of one of the strap plates can be inserted. The spring-pressed bolt members extend through the partition into the plate-receiving chamber so as each to engage the hole in one of the strap plates. In this arrangement the releasing mechanism which lies within the releasing mechanism chamber conveniently comprises a releasing plate through apertures in which the adjacent ends of the bolts pass freely with flanges or like parts on the bolts engaging the face of the releasing plate remote from the plate-receiving chamber. The lever, which lies adjacent to the end of the casing nearer the releasing mechanism chamber, is then conveniently connected to a shaft extending into the releasing mechanism chamber and through a central aperture in the releasing plate, this shaft being formed or provided at its inner end with a face cam which cooperates with a face cam on the adjacent face of the releasing plate to cause the desired movement of the releasing plate when the shaft is rocked. Alternatively, a shaft secured at its inner end to the releasing plate may be acted upon at its outer end by face cam mechanism one part of which is rigid with the lever while the other part is rigid with the shaft.

In any case, the end of each bolt member which extends into the plate-receiving chamber is preferably inclined so that when in its locking position it can be moved against the action of its spring by the insertion of the end of a strap plate and will then move with a snap action into its locking position as soon as the hole in the strap plate comes opposite the bolt member. It will be appreciated that in such an arrangement the bolt members must be suitably held from rotation about their own axes.

In many cases the end of one strap will be connected permanently to the quick-release fastening. This may be done in various ways but in one arrangement the end of the strap is provided with a normal strap plate and the end of this plate enters a slot in the casing and is engaged by an immovable pin passing through the hole in the strap plate and conveniently situated in relation to the slot in the casing in a position similar to that of one of the movable bolt members in relation to its associated slot.

One construction according to the invention is shown by way of example in the accompanying drawing, in which Figure 1 is a front elevation, one part being broken away, Figure 2 is a section on the line II—II of Figure 1, Figure 3 is a view similar to Figure 2 but with the bolts withdrawn, and Figure 4 is a detail view showing the releasing plate in perspective.

The quick-release fastening comprises a cylindrical body part C which may be formed for example of aluminium, one end of which is formed with a shallow cylindrical recess A constituting a plate-receiving chamber while the other end is provided with a deeper cylindrical recess B constituting the releasing mechanism chamber so that the two chambers are separated by a transverse partition. Secured to the ends of the body part, by screws $C^1$, are two end plates $A^1$, $B^1$ respectively closing in the plate-receiving chamber A and the releasing mechanism chamber B, and extending radially through the circumferential wall of the plate-receiving chamber A are four slots $A^2$ each adapted to receive the perforated end of a strap plate D. Formed in the transverse partition C constituted by the portion of the body part which separates the plate-receiving and releasing mechanism chambers is a series of bores, each bore lying opposite the inner end of one of the radial slots $A^2$. Passing through and relatively slidably mounted in one of these bores is a hollow pin E adapted to engage the hole in the strap plate $D^1$ so as to connect this strap plate permanently to the body part. Passing through and adapted to slide freely in each of the other bores, is a bolt member F adapted to engage the hole in the strap plate inserted through the adjacent slot in the plate-receiving chamber A, and the end of each bolt which lies in the plate-receiving chamber is inclined, with its inclined face towards the slot.

The opposite or inner ends of the bolts F which extend into the releasing mechanism chamber B pass freely through a releasing plate G disposed in this chamber and have flanges $F^1$ thereon which engage the face of the releasing plate remote from the plate-receiving chamber A. Each of these flanges is conveniently cut away as at $F^2$ to clear the circumferential wall of the releasing mechanism chamber and this prevents rotation of the bolt F about its own axis. The flanged ends of the bolts are bored out to receive helical springs H which extend therefrom into contact with the plate $B^1$ so that these springs thus tend always to move the bolts F towards the plate-receiving chamber. The releasing plate is provided with a central bore through which passes freely a shaft J also extending freely through the cover $B^1$ and having secured to its outer end, as by a pin, a lever K. The inner end of the shaft J is provided with a flange, having a face cam $J^1$ which cooperates with a face cam $G^1$ formed on the releasing plate so that by rocking the lever K and hence the shaft J the releasing plate G and the bolts F can be moved against the action of the springs H to withdraw the bolts from the plate-receiving chamber A. The face cams $G^1$, $J^1$ are preferably provided with two exactly similar diametrically opposite cam surfaces (Figure 4) each having a part which acts on movement of the lever K into the releasing position to withdraw the bolts, followed by a step $G^2$ which, when the lever has been moved into the fully released position, acts to prevent the return movement of the lever until it is moved in the opposite direction by hand. Each step $G^2$ is conveniently so formed that it permits a slight return movement of the bolts towards the plate chamber so that the force of the springs H acting on the bolts F has to be overcome before the lever can be moved back into its locking position. It will be understood that the arrangement is such that when the lever K has been moved so that the cam surfaces pass over the step $G^2$, the remainder of the movement of the lever into its locking position will take place automatically under the action of the springs H. Further, each of the two diametrically opposite cam surfaces $J^1$, $G^1$ conveniently includes similar surfaces on each side of the diameter, so that movement of the lever K in either direction from its locking position (Figures 1 and 2) effects withdrawal of the ends of the bolts F from the plate-receiving chamber.

It will be seen that with the construction above described the strap plates D can be inserted with the bolt members F in their locking position, the ends of the strap plates acting on the inclined ends of the bolts to move them against the action of their springs H until they snap into the holes in the bolt members, but movement of the lever K from its locking position in either a clockwise or counterclockwise direction instantaneously releases all the strap plates with the exception of the fixed strap $D^1$.

The bolt members and cam surfaces will be formed of some suitable metal, for example silver steel, having the necessary wear-resisting properties and the actual cam mechanism may lie partly or wholly within or may even extend through a bore formed in the partition between the plate-receiving chamber and the releasing mechanism chamber.

What we claim as our invention and desire to secure by Letters Patent is:

1. A quick release fastening for connecting together the strap plates of safety or parachute harness, comprising a casing having a plurality of slots therein each adapted to receive the perforated end of a strap plate, a spring-pressed bolt member associated with each slot mounted within the casing and movable across the slot to engage or release the perforated strap plate, a releasing plate within the casing through which the bolts pass and can slide, a pivoted operating lever outside the casing adapted to be rocked in either direction, cam mechanism between the lever and releasing plate having oppositely inclined portions such that when the lever is rocked in either direction the releasing plate is moved against the action of the bolt springs to withdraw the bolts, and means for retaining the plate and bolts in said released position.

2. A quick release fastening for connecting together the strap plates of safety or parachute harness, comprising a substantially cylindrical casing, a transverse partition dividing the casing into a plate-receiving chamber and a releasing mechanism chamber, a plurality of radial slots in the wall of the plate-receiving chamber each adapted to receive the perforated end of a strap plate, a spring-pressed bolt member extending through the partition into at least two plate-receiving chambers and each adapted to engage the perforation in a strap plate, a releasing plate within the releasing mechanism chamber having apertures through which the ends of the bolts pass, a lever outside the casing mounted to rotate about the axis of the casing in either direction, face cam mechanism including oppositely inclined parts between the lever and releasing plate adapted to move the plate to withdraw the bolts simultaneously from the plate-receiving chamber when the lever is rocked, and means for retaining the cam mechanism and bolts in the released position until the lever is manually again operated to return to its locking position.

3. A quick release fastening device as claimed in claim 2 in which a shaft extending across the axis of the casing has the operating lever mounted on its outer end and a face cam upon its enclosed end, said cam being adapted to cooperate with a face cam on the adjacent face of the releasing plate.

4. A quick release fastening device as claimed in claim 1 in which each bolt member is provided with an inclined end so that when the bolt occupies its locking position, it can be moved against the action of its spring by inserting the end of a strap plate and will resume its locking position with a snap action as soon as the perforation in the plate registers with this end of the bolt member.

5. A quick release fastening device as claimed in claim 1 in which one strap plate is permanently connected to the fastening by means of a fixed pin passing through the hole therein and secured to the casing.

6. A quick release fastening device as claimed in claim 1 in which each of the spring-controlled locking bolts is provided with a flanged head having a surface which engages a wall of the casing and thus prevents rotation of the bolt.

ALBERT ALEXANDER LETHERN.
JOSEPH SECONDO QUIRICO.